US012560245B2

(12) United States Patent
Jones et al.

(10) Patent No.: US 12,560,245 B2
(45) Date of Patent: Feb. 24, 2026

(54) INLINE REPAIRABLE VALVES

(71) Applicant: ValvTechnologies LLC, Houston, TX (US)

(72) Inventors: Jonathan D. Jones, Houston, TX (US); Chuck Jimdar, Houston, TX (US); Gerard St. Martin, Houston, TX (US)

(73) Assignee: ValvTechnologies LLC, Houston, TX (US)

( * ) Notice: Subject to any disclaimer, the term of this patent is extended or adjusted under 35 U.S.C. 154(b) by 7 days.

(21) Appl. No.: 18/221,682

(22) Filed: Jul. 13, 2023

(65) Prior Publication Data

US 2024/0019032 A1      Jan. 18, 2024

Related U.S. Application Data

(60) Provisional application No. 63/388,932, filed on Jul. 13, 2022.

(51) Int. Cl.
F16K 5/06          (2006.01)
F16K 27/06          (2006.01)

(52) U.S. Cl.
CPC .......... F16K 5/0642 (2013.01); F16K 27/067 (2013.01)

(58) Field of Classification Search
CPC ..... F16K 5/0642; F16K 27/067; F16K 5/0631
See application file for complete search history.

(56) References Cited

U.S. PATENT DOCUMENTS

| | | | | |
|---|---|---|---|---|
| 3,077,895 A | * | 2/1963 | Vickery | F16K 5/208 |
| | | | | 137/315.19 |
| 4,479,513 A | * | 10/1984 | Koch | F16K 27/067 |
| | | | | 251/286 |
| 4,524,946 A | * | 6/1985 | Thompson | F16K 5/0678 |
| | | | | 251/316 |
| 11,143,314 B1 | * | 10/2021 | Jackson | F16J 15/186 |
| 2013/0312847 A1 | * | 11/2013 | Avdjian | F16K 5/205 |
| | | | | 137/15.01 |
| 2021/0108494 A1 | * | 4/2021 | Cook | F16K 11/0876 |

* cited by examiner

*Primary Examiner* — Michael R Reid
(74) *Attorney, Agent, or Firm* — Conley Rose, P.C.

(57) ABSTRACT

A valve includes a body having a first end, a second end opposite the first end, and a throughbore extending from the first end to the second end along a central axis, a valve element positioned within the throughbore for selectably isolating fluid flow through the throughbore, a seal end cap including a flange and a neck, wherein the neck is inserted into the throughbore from the second end of the body to engage with the valve element, and a hub end cap including a mounting flange engaged with the flange of the seal end cap, wherein the flange of the seal end cap is engaged with the second end of the body whereby the flange of the seal end cap is compressed between the second end of the body and the mounting flange of seal end cap.

20 Claims, 8 Drawing Sheets

INLINE REPAIRABLE VALVES

CROSS-REFERENCE TO RELATED APPLICATIONS

This application claims benefit of U.S. provisional patent application Ser. No. 63/388,932 filed Jul. 13, 2022, and entitled "Inline Reparable Valves," which is hereby incorporated herein by reference in its entirety for all purposes.

STATEMENT REGARDING FEDERALLY SPONSORED RESEARCH OR DEVELOPMENT

Not applicable.

BACKGROUND

The flow of various types of fluids (e.g., liquids, gasses, multi-phase fluid flows) through a fluid conduit (e.g., pipes, ducts, jumpers, spools, manifolds) may be controlled, throttled, metered, restricted, or prevented via flow control devices often referred to as valves. Valves are used in a variety of contexts and applications for controlling fluid flow. In some applications, valves are integrated within and along a fluid conduit. In such instances, the valves integrated along a fluid conduit may be referred to as "inline valves" given that the valves are installed "inline" with the fluid conduit. Inline valves may be releasably coupled to the fluid conduit they are positioned along while in other instances the inline valve may be permanently (e.g., non-releasably) coupled to the fluid conduit. For instance, in some circumstances, inline valves may be integrated along a fluid conduit by welding.

SUMMARY

Some embodiments disclosed herein are directed to a valve. In some embodiments, the valve a body having a first end, a second end opposite the first end, and a throughbore extending from the first end to the second end along a central axis. In addition, the valve includes a valve element positioned within the throughbore for selectably isolating fluid flow through the throughbore. Further, the valve includes a seal end cap including a flange and a neck, wherein the neck is inserted into the throughbore from the second end of the body to engage with the valve element. Still further, the valve includes a hub end cap including a mounting flange engaged with the flange of the seal end cap, wherein the flange of the seal end cap is engaged with the second end of the body whereby the flange of the seal end cap is compressed between the second end of the body and the mounting flange of seal end cap.

In some embodiments, the valve includes a body having a first end, a second end opposite the first end, and a throughbore extending from the first end to the second end along a central axis. In addition, the valve includes a valve element positioned within the throughbore and a seal end cap including a flange and a neck, wherein the neck is inserted into the throughbore from the second end of the body to engage with the valve element. Further, the valve includes a hub end cap including a mounting flange having an annular mounting surface that defines an end of the hub end cap, wherein the mounting surface is configured to be welded to a first pipe, and wherein the mounting flange of the hub end cap is engaged with the flange of the seal end cap. Still further, the valve includes a plurality of fasteners that extend through flange of the seal end cap, and terminate in the body, the plurality of fasteners configured to releasably couple the body to the first pipe.

Some embodiments disclosed herein are directed to a method. In some embodiments, the method includes (a) withdrawing a first plurality of fasteners from a hub end cap of the valve, the first plurality of fasteners releasably coupling a body of the valve to a first fluid conduit of the fluid conduit system, wherein a valve element is positioned within a throughbore of the body for selectably isolating fluid flow through the throughbore. In addition, the method includes (b) transporting the body and a seal end cap of the valve releasably coupled to the body in a direction orthogonal to a central axis of the first fluid conduit following the withdrawal of the first plurality of fasteners, wherein the seal end cap comprises a neck received in the throughbore of the body to engage with the valve element. Further, the method includes (c) withdrawing the neck of the seal end cap from a throughbore of the body after (a) and (b).

Embodiments described herein comprise a combination of features and characteristics intended to address various shortcomings associated with certain prior devices, systems, and methods. The foregoing has outlined rather broadly the features and technical characteristics of the disclosed embodiments in order that the detailed description that follows may be better understood. The various characteristics and features described above, as well as others, will be readily apparent to those skilled in the art upon reading the following detailed description, and by referring to the accompanying drawings. It should be appreciated that the conception and the specific embodiments disclosed may be readily utilized as a basis for modifying or designing other structures for carrying out the same purposes as the disclosed embodiments. It should also be realized that such equivalent constructions do not depart from the spirit and scope of the principles disclosed herein.

BRIEF DESCRIPTION OF THE DRAWINGS

For a detailed description of various exemplary embodiments, reference will now be made to the accompanying drawings in which.

DETAILED DESCRIPTION

Figure 1:
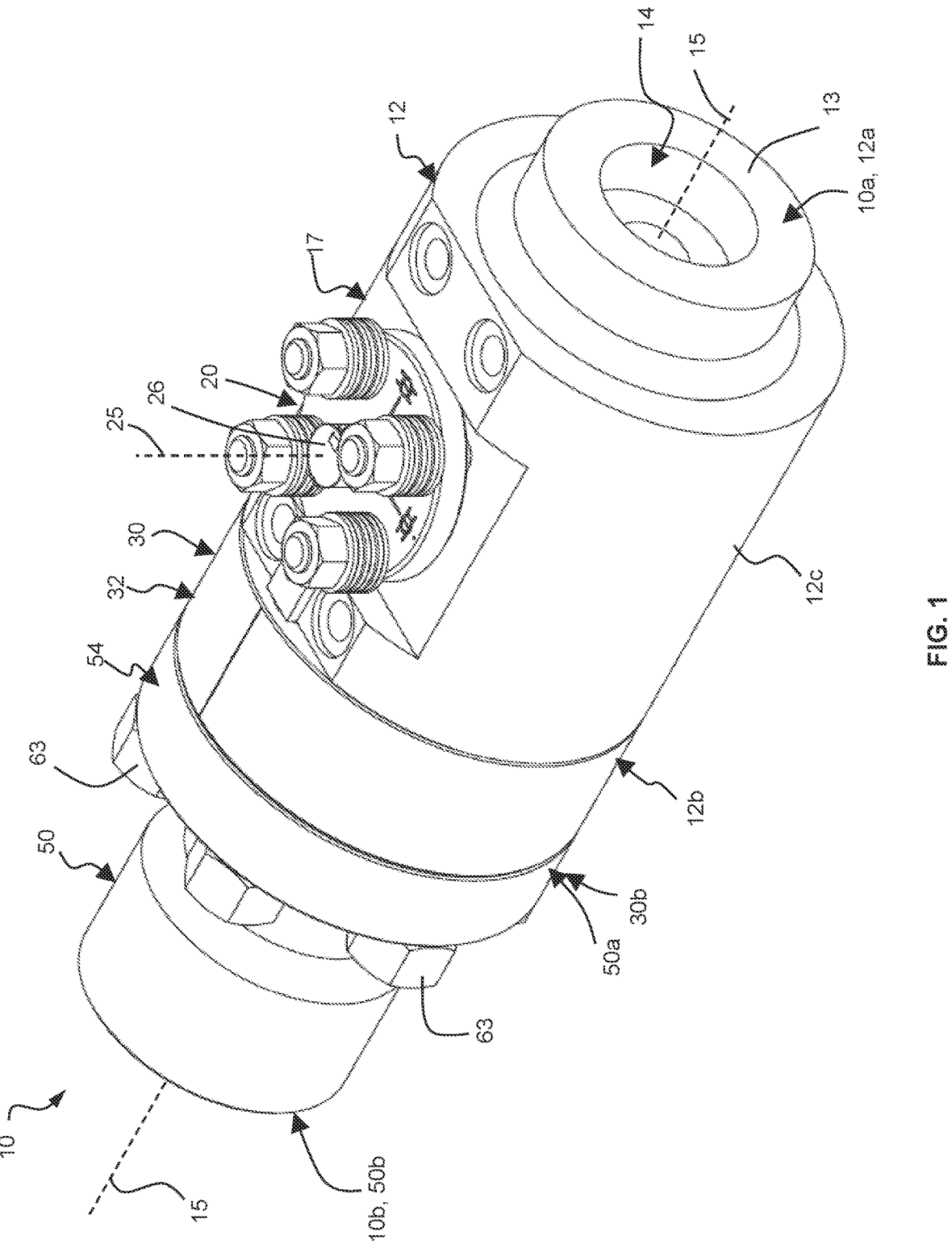
FIG. 1 is a perspective view of an embodiment of an inline repairable valve according to principles disclosed herein.

The following discussion is directed to various exemplary embodiments. However, one of ordinary skill in the art will understand that the examples disclosed herein have broad application, and that the discussion of any embodiment is meant only to be exemplary of that embodiment, and not intended to suggest that the scope of the disclosure, including the claims, is limited to that embodiment. Additionally, the drawing figures are not necessarily to scale. Certain features and components herein may be shown exaggerated in scale or in somewhat schematic form and some details of conventional elements may not be shown in interest of clarity and conciseness.

In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection of the two devices, or through an indirect connection that is established via other devices, components, nodes, and connections. In addition, as used herein, the terms "axial" and "axially" generally mean along or parallel to a given axis (e.g., central axis of a body or a port), while the terms "radial" and "radially" generally mean perpendicular to the given axis. For instance, an axial distance refers to a distance measured along or parallel to the axis, and a radial distance means a distance measured perpendicular to the axis. Further, when used herein (including in the claims), the words "about," "generally," "substantially," "approximately," and the like mean within a range of plus or minus 10%.

As described above, inline valves are a type of valve integrated directly into and along the fluid conduit to which they are coupled. While some inline valves are releasably coupled to the fluid conduit they are positioned along, other inline valves are permanently coupled to the fluid conduit such as by being welded directly to the fluid conduit. In instances where the inline valve is permanently coupled to the fluid conduit, repair and/or replacement of the inline valve (or portions thereof) following installation of the inline valve with fluid conduit may be a laborious, cumbersome, and costly procedure. For instance, the valve may need to be cut from the fluid conduit thus requiring the usage of specialized tools to free the inline valve from the fluid conduit to which it is attached. Conventionally, inline valves must typically be entirely removed from the fluid conduit into which they are integrated in order to access internal features of the inline valve for repair or replacement, such as critical sealing surfaces of the inline valve such as the valve seat of the inline valve.

Accordingly, embodiments disclosed herein include inline valves that may be repaired or serviced without entirely removing or releasing the valve from the fluid conduit into which the inline valve is integrated. Embodiments of such inline valves may be referred to herein as "inline repairable valves" given their ability to be repaired and/or replaced without needing to entirely remove the inline repairable valve from the fluid conduit into which it is integrated Thus, through use of the embodiments disclosed herein, repair and/or service operations for a valve may be more efficient and less costly.

Referring now to FIG. 1, an embodiment of an inline repairable valve 10 (or more simply "valve 10") is shown. Valve 10 includes a central or longitudinal axis 15 that may be aligned with a central axis of a fluid conduit into which the valve 10 is integrated during operations thereof. In addition, valve 10 includes a first or upstream end 10a, and a second or downstream end 10b longitudinally opposite upstream end 10a. Generally, fluid (e.g., liquids, gasses, and/or multi-phase fluids) selectively flows through valve 10 from the upstream end 10a towards and through the downstream end 10b. Thus, during operations the ends 10a, 10b of valve 10 may be connected either releasably (e.g., via one or more fasteners) or permanently (e.g., welded) to corresponding ends of corresponding fluid conduits (e.g., pipes) configured to transport the fluid to and from the valve 10 during operations.

Figure 2:
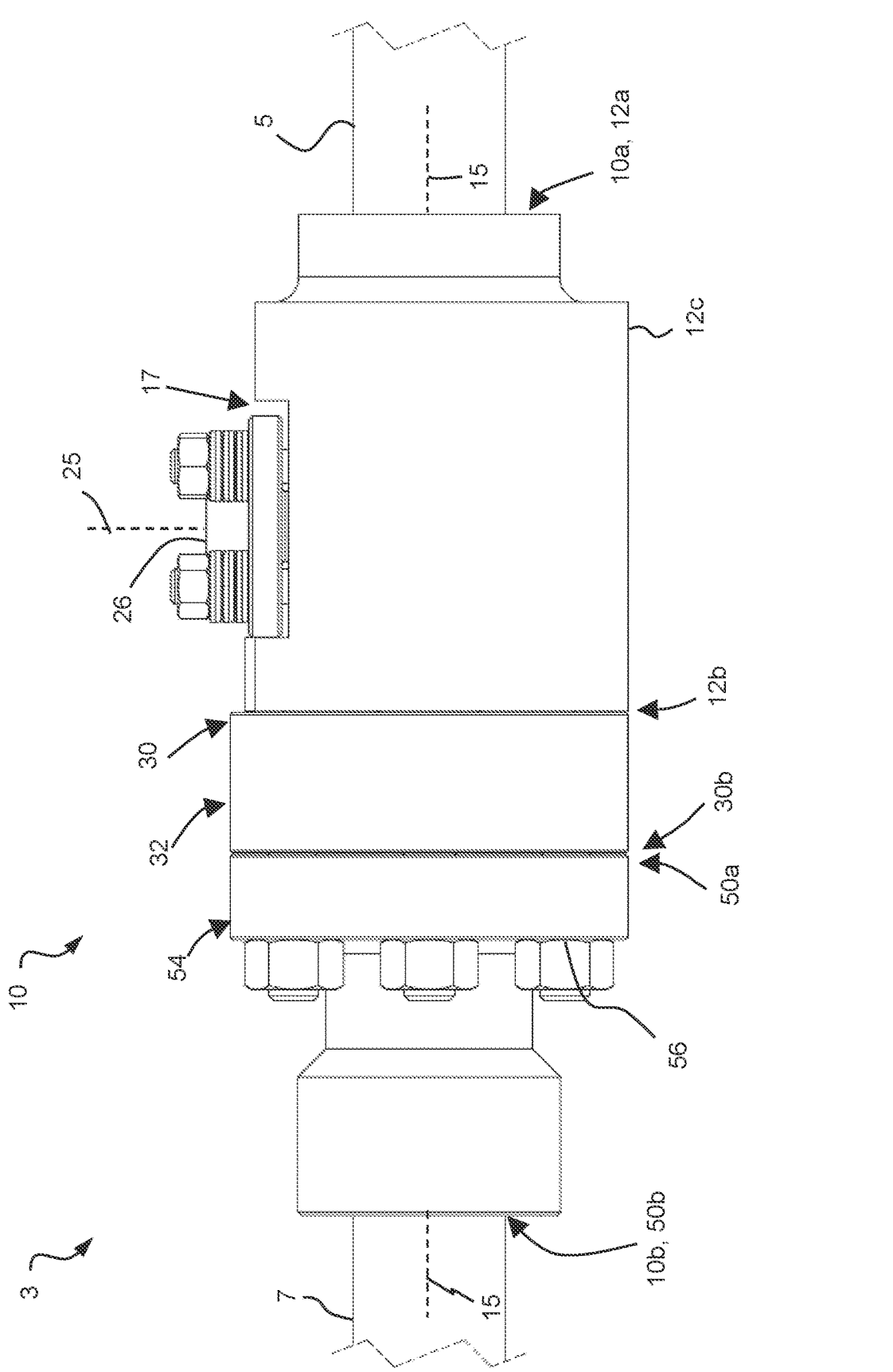
FIG. 2 is a side view of the inline repairable valve of FIG. 1 coupled along a fluid conduit according to principles disclosed herein.
Figure 3:
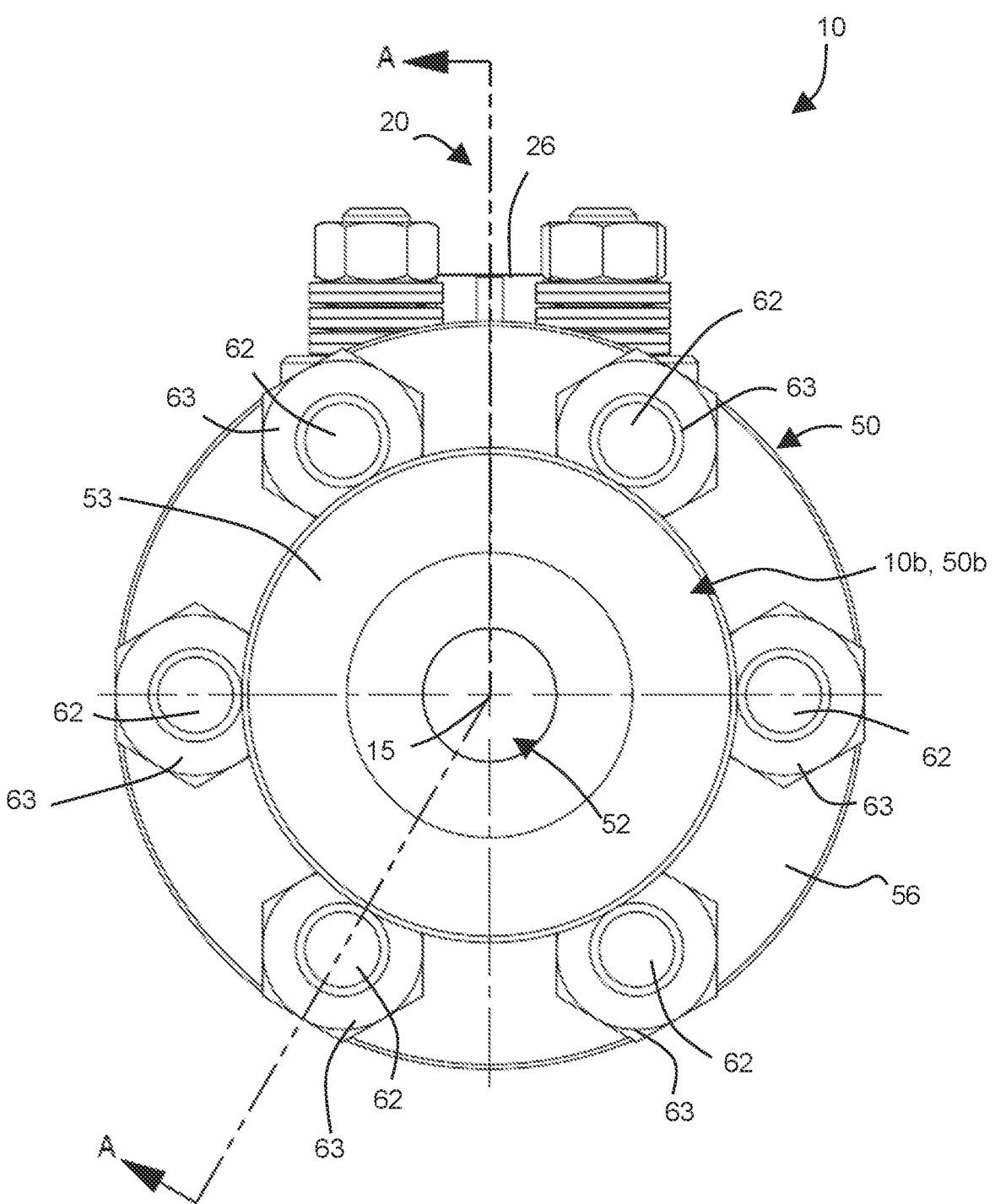
FIG. 3 is an end view of the inline repairable valve of FIG. 1.

Specifically, and referring to FIG. 2, in some embodiments, the upstream end 10a of valve 10 may be connected to an upstream fluid conduit or pipe 5, and the downstream end 10b of valve 10 may be connected to a downstream fluid conduit or pipe 7. The central axis 15 of valve 10 may be arranged coaxially with central axes of the pipes 5 and 7. During operations, fluid may selectively advance from the upstream pipe 5 to the downstream pipe 7 via the valve 10. Accordingly, the upstream pipe 5 and the downstream pipe 7 may define (or partially define) a fluid conduit that includes or incorporates the valve 10 therein. During operations, pipes 5 and 7 and the valve 10 may collectively define a fluid conduit system 3 with the valve 10 coupled inline with the pair of pipes 5 and 7.

Referring generally now to FIGS. 1-5, valve 10 generally includes a body 12, a seal end cap 30, and a hub end cap 50. The body 12 may extend axially from (and define) the upstream end 10a while the hub end cap 50 may extend from (and define) the downstream end 10b. Additionally, the seal end cap 30 is positioned axially between the body 12 and hub end cap 50 along the central axis 15. Each of these features of valve are now described in more detail below.

Body 12 of valve 10 includes a first or upstream end 12a and a second or downstream end 12b opposite upstream end 12a. In addition, body 12 includes a radially outer or exterior surface 12c extending axially between ends 12a, 12b along central axis 15, and a throughbore or central passage 14 also extending axially between ends 12a, 12b along central axis 15. The upstream end 12a of body 12 is coincident with (or defines) the upstream end 10a of valve 10 and, in this exemplary embodiment, includes an annular planar surface 13 that extends circumferentially about the central passage 14 with respect to central axis 15. While surface 13 is planar in this exemplary embodiment, it may be understood that in some embodiments surface 13 may comprise a frustoconical surface that extends at an acute angle (e.g., greater than 0° and less than 90°) relative to central axis 15. The surface 13 may be engaged with a suitable mounting surface of a fluid conduit, such as upstream pipe 5 shown in FIG. 2. For instance, in some embodiments, the surface 13 may be welded to upstream pipe 5 so that body 12 is rigidly and permanently attached thereto.

Figure 4:
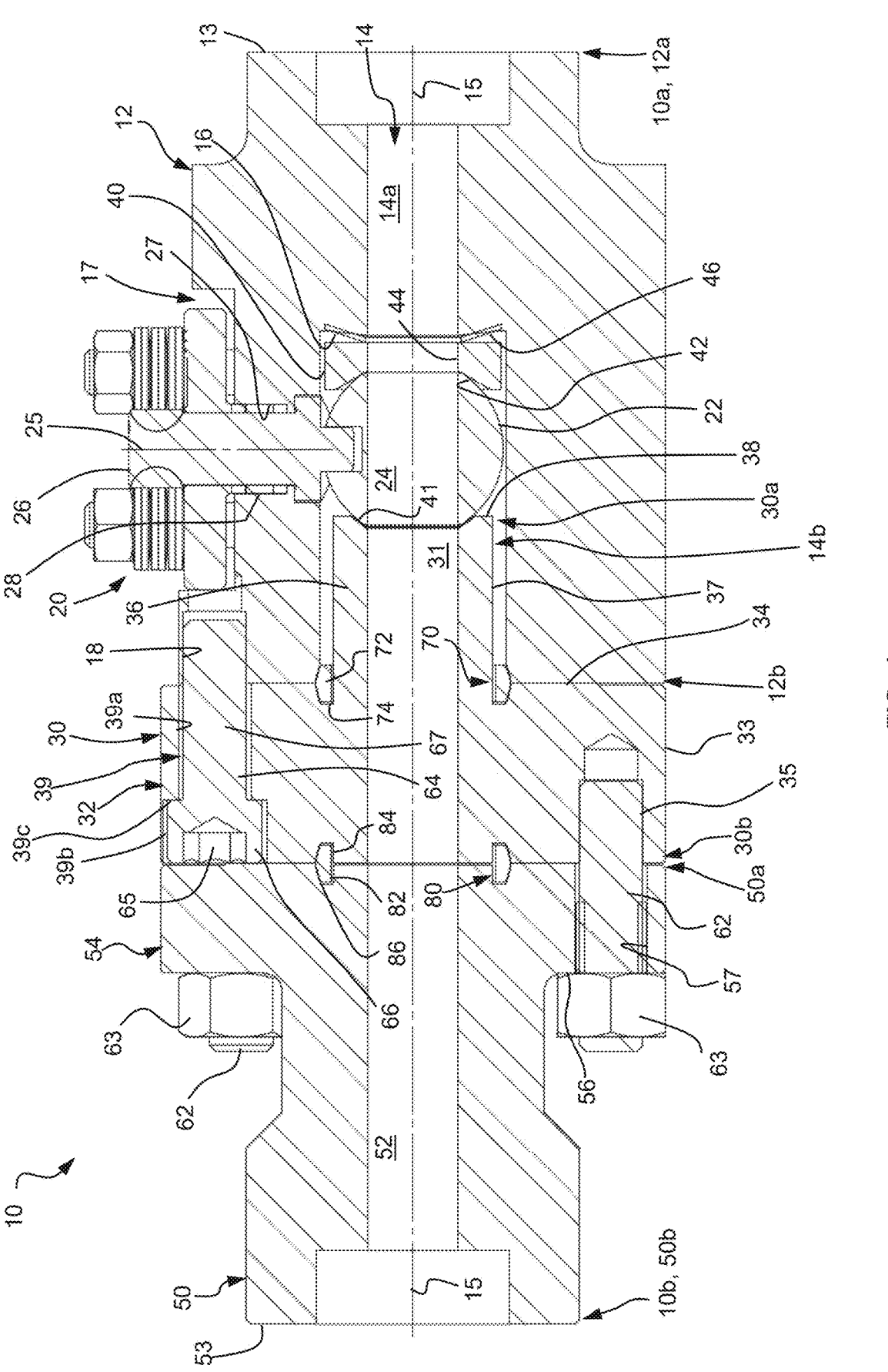
FIG. 4 is a cross-section taken along section A-A in FIG. 3.

As shown particularly in FIG. 4, central passage 14 includes a first or upstream section 14a extending axially from upstream end 12a and a second or downstream section 14b extending axially from upstream section 14a to downstream end 12b along central axis 15. In this exemplary embodiment, the inner diameter of the downstream section 14b is greater than the inner diameter of the upstream section 14a at the intersection of the sections 14a, 14b. Thus, in this exemplary embodiment, a radially extending annular shoulder 16 is formed within the central passage 14 at the intersection of the upstream section 14a and downstream section 14b.

In addition, a recess 17 may extend radially into the radially outer surface 12c, and a receptacle 27 extends radially from recess 17 relative to central axis 15 into the downstream section 14b of central passage 14 along an orthogonal axis 25. Particularly, orthogonal axis 25 is orthogonal to the central axis 15 such that the axes 15, 25 intersect within the downstream section 14b of central passage 14. A valve element 22 is positioned within the downstream section 14b of central passage 14 at the intersection point between the axes 15, 25 such that a geometric center of the valve element 22 may be positioned substantially at the intersection of the axes 15, 25 within central passage 14. In this exemplary embodiment, valve element 22 comprises a spherical (or partially spherical) member that includes a through passage 24 extending therethrough. During operations, the valve element 22 may be rotated about the axis 25 to selectively align or misalign the through passage 24 with the central passage 14 so as to control a flow of fluid through the central passage 14 and valve 10 more generally. Thus, in this exemplary embodiment, valve 10 comprises a ball valve with valve element 22 comprising a ball. However, it may be understood that the configuration of valve 10 and valve element 22 may vary in other embodiments. As one example, in other embodiments, valve 10 may comprise a gate valve or a globe valve with the valve element 22 correspondingly comprising a gate or a plunger, respectively.

Referring still to FIG. 4, an upstream valve seat 40 is positioned within the downstream section 14*b* of central passage 14, whereby the upstream valve seat 40 is captured axially between the valve element 22 and annular shoulder 16 along central axis 15. In particular, the upstream valve seat 40 includes a first or upstream sealing surface 42 and a through passage 44 extending axially through upstream valve seat 40 along central axis 15. The upstream sealing surface 42 is engaged with the valve element 22, and thus may correspond to the shape of the valve element 22. Accordingly, in some embodiments, upstream sealing surface 42 may comprise a spherical (or partially spherical) surface. However, in some embodiments, the upstream sealing surface 42 may have a different shape or contour than the outer surface of the valve element 22. For instance, in some embodiments, the upstream sealing surface 42 may comprise a frustoconical surface. It may also be understood that the geometry of upstream sealing surface 42 may vary in embodiments where the valve element 22 is not spherical, such as embodiments in which valve 10 does not comprise a ball valve.

In addition, in this exemplary embodiment, a biasing member 46 is positioned axially between the upstream valve seat 40 and the annular shoulder 16. In some embodiments, the biasing member 46 may comprise an annular biasing member such as a Belleville washer or other suitable member. During operations, the biasing member 46 is configured to axially bias the upstream valve seat 40 into engagement with the valve element 22 along central axis 15, and thus is also configured to axially bias both the valve seat 40 and the valve element 22 toward downstream end 12*b* of body 12 along central axis 15. In this manner, biasing member 46 may maintain sealing contact between the valve element 22 and the upstream sealing surface 42 of upstream valve seat 40.

A valve actuation assembly 20 is installed within the body 12 that is configured to rotate the valve element 22 about the axis 25 to control fluid flow through valve 10 during operations. In particular, the valve actuation assembly 20 includes a shaft 26 that extends through the receptacle 27 along axis 25 to engage the valve element 22. A suitable handle or tool (not shown) may be engaged with the shaft 26 so as to rotate both shaft 26 and valve element 22 together about axis 25 to selectively align or misalign the through passage 24 of the valve element 22 with the upstream section 14*a* of central passage 14. Particularly, the valve element 22 may occupy a first angular position in the body 12 in which the through passage 24 of valve element 22 is aligned with the upstream section 14*a* of central passage 14, where the first angular position of valve element 22 corresponds to an open configuration of the valve 10. Conversely, valve element 22 may occupy a second angular position in the body 12 angularly spaced from the first angular position in which the through passage 24 of valve element 22 is misaligned with the upstream section 14*a* of central passage 14, where the second angular position of valve element 22 corresponds to a closed configuration of the valve 10

In this exemplary embodiment, a seal assembly 28 (e.g., an O-ring, gasket, etc.) is also positioned within receptacle 27 about shaft 26 to prevent fluid from exiting the body 12 along the interface formed between shaft 26 and receptacle 27 during operations. The seal assembly 28 may form a dynamic seal that maintains a suitable seal within the receptacle 27 even as shaft 26 rotates about axis 25 to rotate valve element 22 within downstream section 14*b* of central passage 14 as previously described.

Referring still to FIG. 4, the seal end cap 30 of valve 10 includes a first or upstream end 30*a* and a second or downstream end 30*b* longitudinally opposite the upstream end 30*a*. When the seal end cap 30 is engaged with body 12, the seal end cap 30 may be generally coaxially aligned with body 12 along central axis 15, and the ends 30*a*, 30*b* may be spaced longitudinally from one another along central axis 15.

Additionally, an annular flange 32 extends axially from downstream end 30*b*, and a neck 36 extends axially from flange 32 to upstream end 30*a*. More specifically, annular flange 32 defines an outer cylindrical surface 33 that extends axially from downstream end 30*b*, and neck 36 comprises an outer cylindrical surface 37 that extends axially from upstream end 30*a*. In this exemplary embodiment, the cylindrical surface 33 has a greater outer diameter than the cylindrical surface 37 with respect to central axis 15, and thus, a planar, annular shoulder 34 is formed between the cylindrical surfaces 33 and 37 that extends radially with respect to central axis 15.

In this exemplary embodiment, a plurality of circumferentially spaced first mounting holes 35 and a plurality of circumferentially spaced second mounting bores 39 extend axially (relative to central axis 15) into annular flange 32 from the downstream end 30*b* of seal end cap 30. First mounting holes 35 each comprise an internally threaded cylindrical bore or aperture having a substantially constant inner diameter with respect to central axis 15. In addition, the second mounting bores 39 each comprise a first or upstream cylindrical section 39*a* extending axially into annular flange from annular shoulder 34, and a second or downstream cylindrical section 39*b* extending into annular flange 32 from downstream end 30*b* of seal end cap 30. The downstream section 39*b* may have a larger inner diameter than the upstream section 39*a* so that a radially extending (with respect to axis 15) annular shoulder 39*c* is formed between sections 39*a*, 39*b*.

Figure 5:
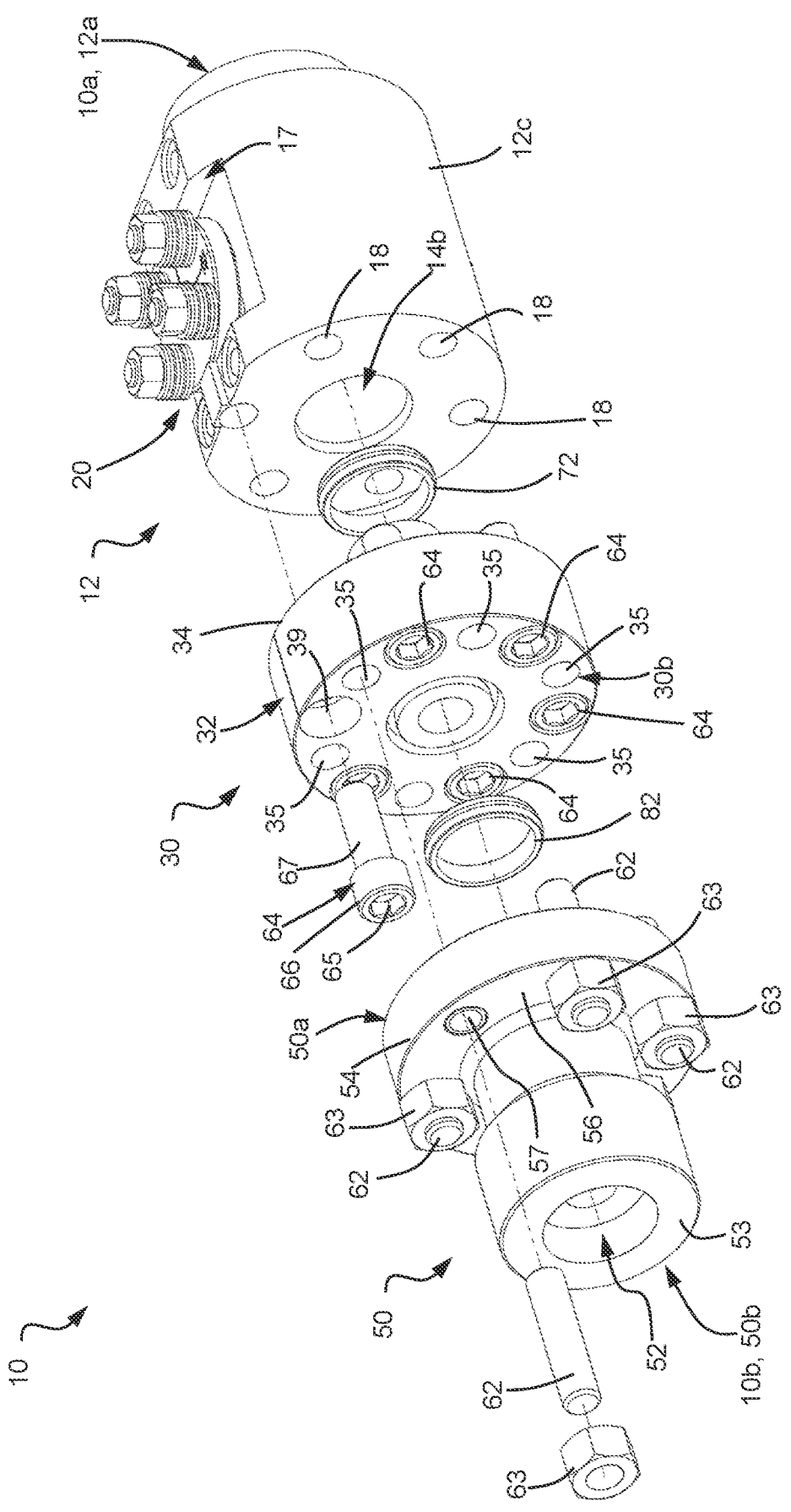
FIG. 5 is an exploded, perspective view of the inline repairable valve of FIG. 1.

As best shown in FIGS. 4 and 5, the first mounting holes 35 are interspersed or interleaved with the second mounting bores 39 circumferentially about central axis 15. Thus, each first mounting bore 3 is circumstantially spaced between a pair of adjacent second mounting bores 39, and each second mounting bore 39 is circumferentially spaced between a pair of adjacent first mounting holes 35 about central axis 15. Additionally, each of the second mounting bores 39 may circumferentially align with a plurality of mounting bores 18 extending axially into downstream end 12*b* of body 12.

In this exemplary embodiment, a downstream valve seat 38 of valve 10 is integrally formed on the upstream end 30*a* of seal end cap 30. The downstream valve seat 38 includes a downstream sealing surface 41. Thus, the downstream sealing surface 41 of downstream valve seat 38 is integrally or monolithically formed on seal end cap 30 in this exemplary embodiment so that downstream valve seat 38 may be referred to as an "integral seat." As shown particularly in FIG. 4, during operations, the upstream end 30a and neck 36 are inserted longitudinally within downstream section 14b of central passage 14 so that downstream valve seat 38 and particularly downstream sealing surface 41 engages with valve element 22. As with the upstream sealing surface 42, downstream sealing surface 41 may correspond to the shape of the valve element 22, and thus may comprise a spherical (or partially spherical) surface. However, in some embodiments, the downstream sealing surface 41 may have a different shape or contour than the outer surface of the valve element 22, such as, for instance a frustoconical shape.

During operations, the biasing member 46 may axially bias the upstream seat 40 into engagement with the valve element 22, and may axially bias the valve element 22 into the downstream valve seat 38 along central axis 15. Thus, the biasing member 46 may axially compress the valve element 22 between the upstream seat 40 and downstream valve seat 38 (or more particularly between the sealing surfaces 42, 41) along central axis 15. In this manner, biasing member 46 may maintain sealing contact between the valve element 22 and both the upstream sealing surface 42 of upstream valve seat 40 and the downstream sealing surface 41 of downstream valve seat 38.

Seal end cap 30 also includes a throughbore or central passage 31 extending axially between ends 30a, 30b along central axis 15 (when seal end cap 30 is installed within valve 10 as shown). When neck 36 of seal cap 30 is inserted within downstream section 14b of central passage 14, the throughbore 31 may be generally coaxially aligned with the upstream section 14a of central passage 14. As a result, when valve element 22 is rotated about axis 25 to align the through passage 24 with upstream section 14a of central passage 14, the throughbore 31 of seal end cap 30 may also be coaxially aligned with through passage 24 so that fluid may flow from upstream section 14a, through biasing member 46 and through passage 44 of upstream seat 40, and through passage 24 of valve element 22 into throughbore 31 of seal end cap 30.

Referring again to FIGS. 1-5, hub end cap 50 of valve 10 includes a first or upstream end 50a, a second or downstream end 50b opposite upstream end 50a, and a throughbore or central passage 52 extending between ends 50a, 50b. Upstream end 50a may be engaged with downstream end 30b of seal end cap 30 so that central passage 52 extends axially along central axis 15 between ends 50a, 50b. Thus, when upstream end 50a of hub end cap 50 is engaged with downstream end 30b of seal end cap 30, the central passage 52 may be coaxially aligned with throughbore 31 (and thus also upstream section 14a of central passage 14) along central axis 15.

In this exemplary embodiment, the downstream end 50b of hub end cap 50 is coincident with (or defines) the downstream end 10b of valve 10, and includes a planar annular surface 53 that extends circumferentially about the central passage 52 with respect to central axis 15. In some embodiments, the planar surface 53 may extend only radially with respect to central axis 15. However, in some embodiments, surface 53 may comprise a frustoconical surface that extends at an acute angle (e.g., greater than 0° and less than 90°) relative to central axis 15. The surface 53 may be engaged with and coupled to a suitable mounting surface of a fluid conduit (e.g., downstream pipe 7 shown in FIG. 2). For instance, in some embodiments, the planar annular surface 53 may be permanently coupled (e.g., welded) to downstream pipe 7 so that hub end cap 50 is rigidly and permanently attached thereto.

In addition, hub end cap 50 includes a mounting flange 54 at the upstream end that includes a mounting surface 56 extending radially with respect to central axis 15 (e.g., when hub end cap 50 is installed within valve 10 as shown in FIGS. 1-4). A plurality of circumferentially spaced first mounting bores 57 extend axially (relative to central axis through mounting flange 54 from mounting surface 56 to upstream end 50a. In this exemplary embodiment, first mounting bores 57 each comprise a cylindrical bore or aperture having a substantially constant inner diameter axially between mounting surface 56 and upstream end 50a with respect to central axis 15. As best shown in FIGS. 4 and 5, each of the first mounting bores 57 may circumferentially align with a corresponding one of a plurality of first mounting holes 35 extending axially through the annular flange 32 of the seal end cap 30 with respect to central axis 15. Conversely, each of the first mounting bores 57 are circumferentially spaced from the second mounting bores 39 extending axially through the annular flange 32 of the seal end cap 30 with respect to central axis 15.

Referring still to FIGS. 4 and 5, a plurality of first fasteners 62 of valve 10 extends axially (with respect to central axis 15) through the aligned first mounting bores 57 and first mounting holes 35 of the hub end cap 50 and seal end cap 30, respectively. In some embodiments, the first fasteners 62 may each comprise an externally threaded (or partially threaded) stud or bolt that is threadably engaged with internal threads formed within the first mounting holes 35 of seal end cap 30. Thus, the first fasteners 62 may be said to terminate within seal end cap 30 (particularly within the first mounting holes 35 of seal end cap 30). The first mounting bores 57 of hub end cap 50 may not include threads in some embodiments so that the first fasteners 62 may freely slide axially (with respect to axis 15) therein during operations. An internally threaded nut 63 may be threadably engaged with the first fastener 62 until the threaded nut 63 engages or abuts with the mounting surface 56 on flange 54. Thus, the mounting flange 54 of the hub end cap 50 may be axially compressed between the threaded nuts 63 on each of the first fasteners 62 and the downstream end 30b of seal end cap 30 with respect to the central axis 15.

In addition, a plurality of second fasteners 64 of valve 10 extends axially (with respect to central axis 15) through the second mounting bores 39 of seal end cap and into the mounting bores 18 of body 12. In some embodiments, each of the second fasteners 64 may comprise an externally threaded screw having a head 66 and an externally threaded pin 67 extending from head 66. The head 66 includes a mating receptacle 65 to engage with a corresponding tool (not shown) for applying toque to second fastener 64 during operations. Each threaded pin 67 may extend through the second mounting bores 39 in seal end cap 30 and into the mounting bores 18 of body 12 where each threaded pin 67 may threadably engage with internal threads formed within the mounting bores 18. Thus, the second fasteners 64 may be said to terminate within body 12 (particularly within the mounting bores 18 in body 12). The second mounting bores 39 may not include threads so that the pin 67 may freely slide axially (with respect to axis 15) therein during operations. The threaded engagement and advance of the pin 67 may continue until the head 66 engages or abuts with the annular shoulder 39c within second mounting bore 39. Thus, the mounting flange 54 of the hub end cap 50 is axially compressed against the annular flange 32 of the seal end cap 30 along the central axis via the second fasteners 64 independently of the first fasteners 62.

Referring again to FIG. 4, an annular first seal assembly 70 of valve 10 is positioned annularly or circumferentially about the seal end cap 30 with respect to axis Particularly, in this exemplary embodiment, the first seal assembly 70 is positioned about the neck 36 at the intersection of neck 36 and annular flange 32. The first seal assembly 70 includes an annular seal member 72 that is seated within an annular seal groove 74 that extends axially into the annular shoulder 34 of annular flange 32 with respect to axis 15. The seal groove 74 may be aligned and flush with the outer surface 37 of neck 36 so that the annular seal member 72 may protrude axially outward from seal groove 74 along the cylindrical surface 37. When seal end cap 30 is secured to the body 12 as shown in FIG. 4, the annular seal member 72 may be radially compressed between the inner wall of downstream section 14b of central passage 14 and cylindrical surface 37 of neck 36 so that the annular seal member 72 may prevent (or at least restrict) the flow of fluids between downstream end 12b of body 12 and shoulder 34 of seal end cap during operations.

Referring still to FIG. 4, an annular second seal assembly 80 of valve 10 is positioned annularly or circumferentially about the axis 15 and axially positioned between the upstream end 50a of hub end cap 50 and downstream end 30b of seal end cap 30. The second seal assembly 80 includes an annular seal member 82 that is seated within a first annular groove 84 extending axially into the downstream end 30b of seal end cap and a second annular groove 86 extending axially into the upstream end 50a of hub end cap 50. When hub end cap 50 is secured to the seal end cap 30 as shown in FIG. 4 and described above, the annular seal member 82 may be axially compressed between the first annular seal groove 84 and second annular seal groove 86 along axis 15 so that the annular seal member 82 may prevent (or at least restrict) the flow of fluids between ends 50a, 30b of end caps 50, 30, respectively, during operations.

The annular seal members 72, 82 may comprise any suitable material for forming a fluid seal when placed under compression. For instance, in some embodiments, the annular seal members 72, 82 may comprise an elastomeric material, a compliant metallic material, a composite material, or a combination thereof. In some embodiments, annular seal members 72, 82 may comprise a seal ring (e.g., O-ring), a gasket, etc.

Referring again to FIGS. 2, 4, and 5, during operations, internal components of the valve 10 (e.g., valve element 22, upstream seat 40, downstream valve seat 38, biasing member 46, seal assemblies 70, 80, etc.) may wear or fail, thus necessitating repair or replacement of valve 10 or one or more components thereof. As previously described above, total removal from and subsequent re-installation of the valve 10 within the pipes 7 (shown in FIG. 2) may be a tedious and costly procedure. In particular, in some embodiments cutting or otherwise removing the welded connections between upstream ends 12a, 10a and upstream pipe 5 and between downstream ends 10b, 50b and downstream pipe 7 may necessitate subsequent welding operations to re-engage the replaced or repaired valve 10 with pipes 5, 7 to reinitiate fluid flow therethrough. Such welding operations may involve highly qualified technicians using specialized equipment that can significantly increase the total down time and costs associated with such repairs. In addition, re-welding the valve 10 to the pipes 5, 7, may also trigger additional post-weld inspections that may further delay a return of the valve 10 and pipes 5, 7, to service following a repair or replacement operation Accordingly, the valve 10 is constructed and configured to allow repair and replacement of the internal components without complete removal of the valve 10 from the pipes 5, 7 so as to avoid these additional undesirable delays and associated costs.

Specifically, during operations, when access to the internal components of valve 10 is desired (e.g., for repair and/or replacement thereof), the plurality of first fasteners 62 may be removed from the aligned mounting bores 57 and mounting holes 35in the hub end cap 50 and seal end cap 30, respectively. Following the removal of hub end cap 50, the plurality of second fasteners 64 may be removed from the aligned mounting bores 39 and 18 of seal end cap 30 and body 12, respectively. Once the second fasteners 64 are removed, the seal end cap 30 may be removed from the body 12. In some embodiments, the fluid flow line formed by the upstream pipe 5 and downstream pipe 7 (FIG. 2) may have enough flexibility to allow for the axial separation of seal end cap 30 from body 12 and the withdrawal of the neck 36 of seal end cap 30 from downstream section 14b of central passage 14 in body 12. In some embodiments, a tool or mechanism (not shown) may be coupled to seal end cap 30 and the body 12 to forcibly, axially separate the seal end cap 30 from the body 12 along axis 15.

Once the neck 36 of seal end cap 30 is withdrawn from downstream section 14b of central passage 14, full access may be gained into central passage 14 from downstream end 12b so that valve element 22, upstream seat 40, biasing member 46, or other components therein may be retrieved for repair and/or replacement. In addition, following removal of the neck 36 of seal end cap 30 from downstream section 14b of central passage 14, the seal end cap 30 may be replaced or repaired as desired. It should be appreciated that all such repairs or replacement of the components of valve 10 may be made may without disturbing the connections (e.g., welds) between the downstream end 50b of hub end cap 50 and downstream pipe 7 and between the upstream end 12a and upstream pipe 5. As a result, the time and costs associated with cutting (and eventually re-connecting) the valve 10 from the fluid conduit formed by the pipes 5, 7, may be avoided and the overall process for repairing or servicing the valve 10 may be greatly simplified.

Figure 6:
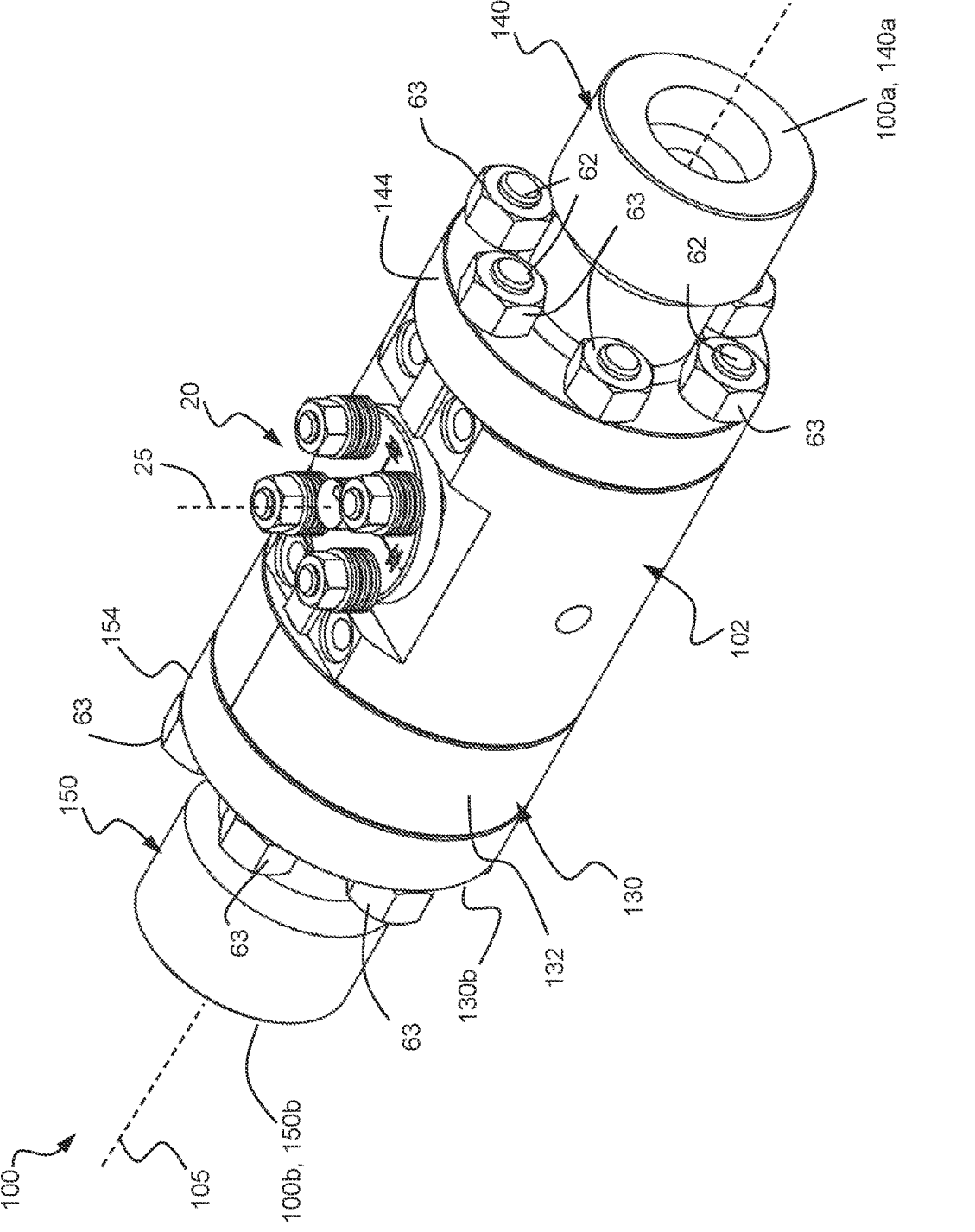
FIG. 6 is a perspective view of another valve according to principles disclosed herein.
Figure 7:
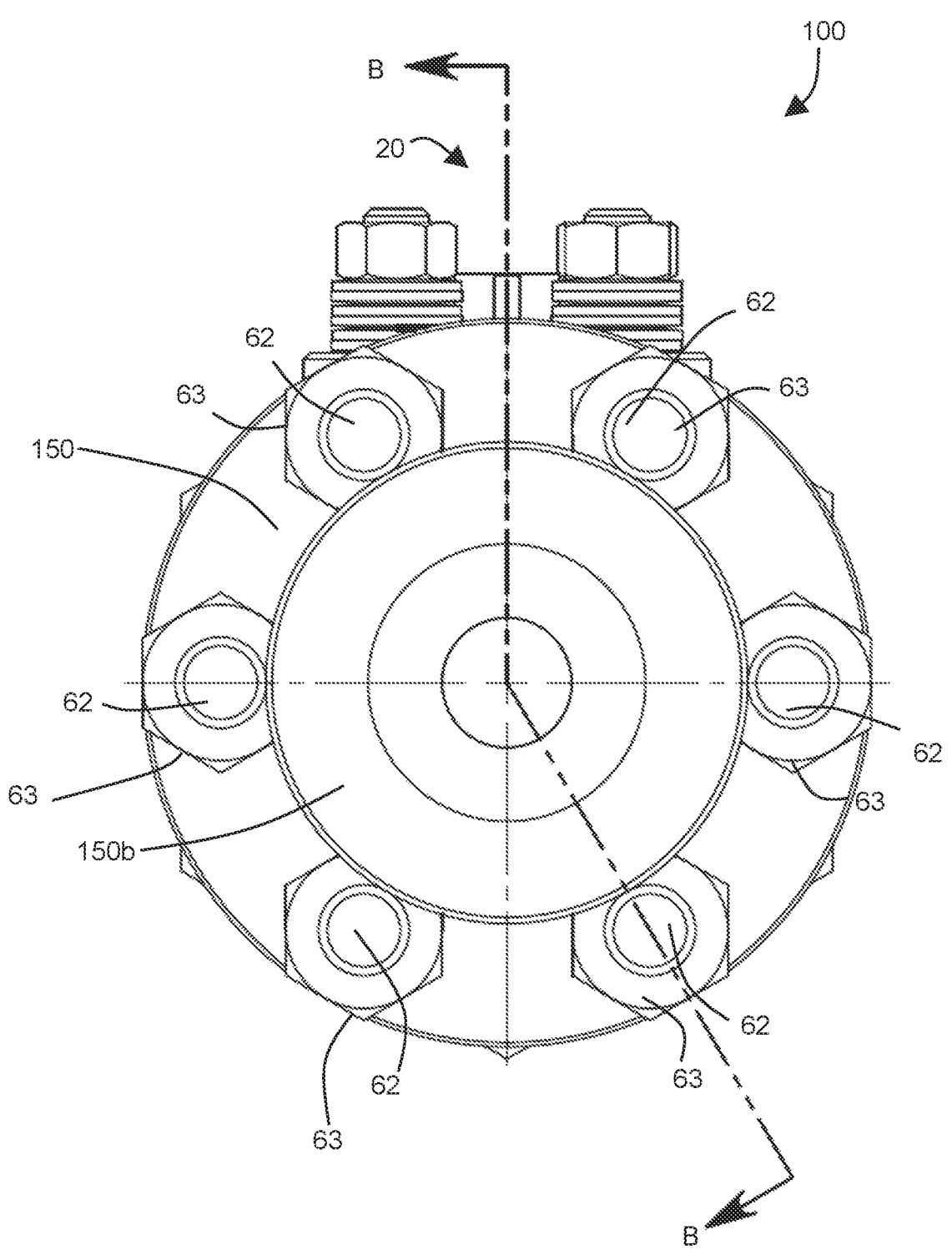
FIG. 7 is an end view of the inline repairable valve of FIG. 8.
Figure 8:
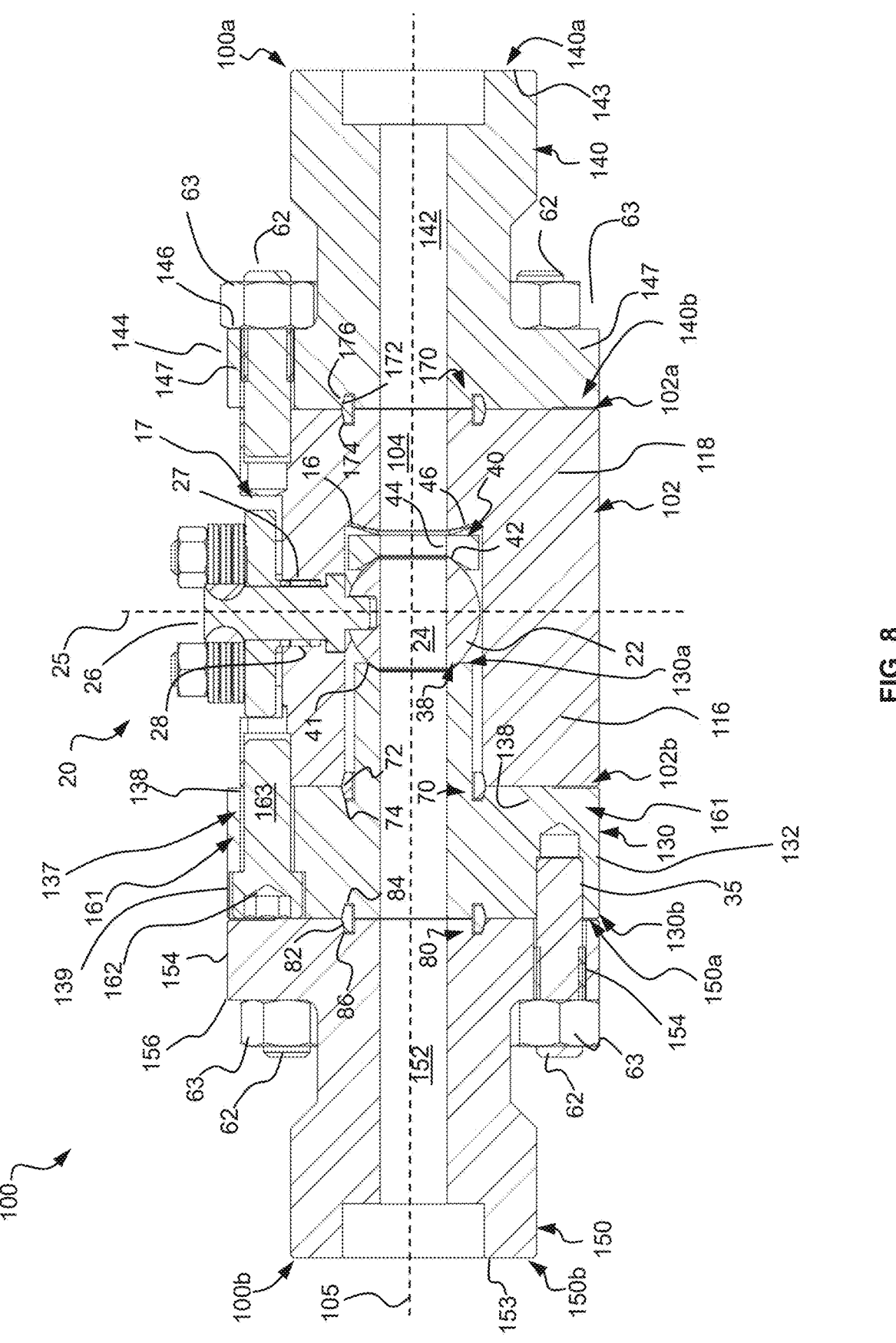
FIG. 8 is a cross-sectional view taken along section B-B in FIG. 7.

Referring now to FIGS. 6-8, another embodiment of an inline repairable valve 100 (or simply "valve 100") according to some embodiments is shown. Valve 100 includes features in common with valve 10 shown in FIGS. 1-5, and shared features are labeled similarly. Valve 100 extends along a longitudinal or central axis 105 and generally includes a body 102, a seal end cap 130, a first or upstream hub end cap 140, and a second or downstream hub end cap 150. In this exemplary embodiment, the upstream hub end cap 140 extends from (and defines) a first or upstream end 100a of the valve 100 while the downstream hub end cap 150 extends from (and defines) a downstream end 100b of the valve 100. Additionally, the seal end cap 130 is positioned axially between the body 102 and downstream hub end cap 150 along the central axis 105. Each of these features of valve 100 are now described in more detail below.

Body 102 of valve 100 includes a first or upstream end 102a and a second or downstream end 102b longitudinally opposite upstream end 102a. In addition, body 102 includes a throughbore or central passage 104 extending axially between ends 102a, 102b along central axis 105. In this exemplary embodiment, the upstream end 102a of body 102 defines an annular upstream planar surface 103 while the downstream end 102a of body 102 defines an annular downstream planar surface 107 both of which extends circumferentially about the central passage 104 with respect to central axis 105. While surfaces 103 and 107 are planar in this exemplary embodiment, it may be understood that in some embodiments surfaces 103 and/or 107 may comprise frustoconical surfaces that extends at an acute angle relative to central axis 105.

The seal end cap 130 of valve 100 includes a first or upstream end 130a and a second or downstream end 130b longitudinally opposite the upstream end 130a. When the seal end cap 130 is engaged with body 102, the seal end cap 30 is generally coaxially aligned with body 102 along central axis 105, and the ends 130a, 130b may be spaced longitudinally from one another along central axis 105. Seal end cap 130 additionally an annular flange 132 extends axially from downstream end 130b and a neck 136 extends axially from flange 132 to upstream end 130a, where a planar, annular shoulder 134 is formed between the flange 132 and neck 136. Seal end cap 130 further includes a throughbore or central passage 131 extending axially between ends 130a, 130b along central axis 105 (when seal end cap 130 is installed within valve 100 as shown in FIGS. 6-8).

In this exemplary embodiment, a plurality of circumferentially spaced mounting bores 137 extend axially (relative to central axis 105) through the flange 132 from downstream end 130b the shoulder 134 of seal end cap 130. The mounting bores 137 each comprise a first or upstream cylindrical section 138 extending axially from shoulder 134, and a second or downstream cylindrical section 139 extending axially from downstream end 130b. The downstream section 139 may have a larger inner diameter than the upstream section 138 so that a radially extending (with respect to axis 105) annular shoulder is formed between sections 138 and 139.

Each of the mounting bores 137 of seal end cap 130 may circumferentially align with a corresponding one of a first plurality of downstream mounting bores 116 extending axially into the downstream end 102b of body 102. In addition, during operations, a plurality of fasteners 161 of valve 100 extends axially (with respect to central axis 105) through the mounting bores 137 of seal end cap 130 and into the first plurality of downstream mounting bores 116 of body 102. In some embodiments, each of the fasteners 161 may comprise an externally threaded screw having a head 162 and an externally threaded pin 163 extending from head 162. The head 162 includes a mating receptacle to engage with a corresponding tool (not shown) for applying toque to fasteners 161 during operations. Each threaded pin 163 may extend through the mounting bores 137 in seal end cap 130 and threadably engage with internal threads formed within the downstream mounting bores 116 of body 102. Thus, the fasteners 161 may be said to terminate within the downstream end 102b of body 102. The mounting bores 137 may not include threads so that the pin 163 may freely slide axially (with respect to axis 105) therein during operations. The threaded engagement and advance of the pin 163 may continue until the head 162 engages or abuts with the annular shoulder within mounting bore 137. Thus, the flange 132 of the seal end cap 130 is axially compressed against the downstream end 102b of body 102 along the central axis 105 via the fasteners 161.

Referring still to FIGS. 6-8, upstream hub end cap 140 of valve 100 includes a first or upstream end 140a, a second or downstream end 140b longitudinally opposite upstream end 140a, and a throughbore or central passage 142 extending between ends 140a, 140b. Upstream end 140a of upstream hub end cap 140 is coincident with (and defines) the upstream end 100a of valve 100 in this exemplary embodiment. Additionally, upstream hub end cap 140 includes a planar annular surface 143 that extends circumferentially about the central passage 142 with respect to central axis 105. In this exemplary embodiment, the planar surface 143 extends only radially with respect to central axis 105. However, in some embodiments, surface 143 may comprise a frustoconical surface that extends at an acute angle relative to central axis 105. The surface 143 may be engaged with and coupled to a suitable mounting surface of a fluid conduit (e.g., upstream pipe 5 shown in FIG. 2). For instance, in some embodiments, the surface 143 may be permanently coupled (e.g., welded) to upstream pipe 5 so that body 102 of valve 100 is rigidly and permanently attached thereto.

In addition, upstream hub end cap 140 includes a mounting flange 144 at the downstream end 140b that includes a mounting surface 146 extending radially with respect to central axis 105 (e.g., when hub end cap 140 is installed within valve 100 as shown in FIG. 8). A plurality of circumferentially spaced mounting bores 147 extend axially (relative to central axis 105) through mounting flange 144 from mounting surface 146 to downstream end 140b. In this exemplary embodiment, mounting bores 147 each comprise a cylindrical bore or aperture having a substantially constant inner diameter axially between mounting surface 146 and downstream end 140b with respect to central axis 105.

In this exemplary embodiment, each of the mounting bores 147 may circumferentially align with a corresponding one of a plurality of upstream mounting bores 118 extending axially into the upstream end 102a of body 102. Additionally, a plurality of the first fasteners 62 extends axially (with respect to central axis 105) through the aligned first mounting bores 147 of the upstream hub end cap 140 and into the upstream mounting bores 118 of body 102. In some embodiments, the first fasteners 62 are threadably engaged with internal threads formed within the upstream mounting bores 118 of body 102. In addition, nuts 63 may be threadably engaged with the first fasteners 62 until the threaded nut 63 engages or abuts with the mounting surface 146 on flange 144. Thus, the mounting flange 144 of the upstream hub end cap 140 may be axially compressed between the threaded nuts 63 on each of the first fasteners 62 and the upstream end 102a of body 102 with respect to the central axis 105.

An annular seal assembly 170 of valve 100 is positioned annularly or circumferentially about the axis 105 and axially positioned between the downstream end 140b of upstream hub end cap 140 and the upstream end 102a of body 102. The seal assembly 170 includes an annular seal member 172 that is seated within an annular groove 174 extending axially into the upstream end 02a of body 102 and another annular groove 176 extending axially into the downstream end 140b of upstream hub end cap 140. When upstream hub end cap 140 is secured to the body 102 as shown in FIG. 8, the annular seal member 172 may be axially compressed between the annular seal grooves 174 and 176 along axis 105 so that the annular seal member 172 may prevent (or at least restrict) the flow of fluids between ends 102a and 140b of body 102 and upstream hub end cap 140, respectively, during operations.

Referring still to FIGS. 6-8, downstream hub end cap 150 of valve 100 includes a first or upstream end 150a, a second or downstream end 150b longitudinally opposite upstream end 150a, and a throughbore or central passage 152 extending between ends 150a, 150b. Downstream end 150b of downstream hub end cap 150 is coincident with (and defines) the downstream end 100*b* of valve 100 in this exemplary embodiment. Additionally, downstream hub end cap 150 includes a planar annular surface 153 that extends circumferentially about the central passage 152 with respect to central axis 105. In this exemplary embodiment, the planar surface 153 extend only radially with respect to central axis 105. However, in some embodiments, surface 153 may comprise a frustoconical surface that extends at an acute angle relative to central axis 105. The surface 153 may be engaged with and coupled to a suitable mounting surface of a fluid conduit (e.g., upstream pipe 5 shown in FIG. 2). For instance, in some embodiments, the surface 153 may be permanently coupled (e.g., welded) to upstream pipe 5 so that body 102 of valve 100 is rigidly and permanently attached thereto.

In addition, downstream hub end cap 150 includes a mounting flange 154 at the downstream end 150*b* that includes a mounting surface 156 extending radially with respect to central axis 105 (e.g., when hub end cap 150 is installed within valve 100 as shown in FIG. 8). A plurality of circumferentially spaced mounting bores 157 extend axially (relative to central axis 105) through mounting flange 154 from mounting surface 156 to upstream end 150*a*. In this exemplary embodiment, mounting bores 157 each comprise a cylindrical bore or aperture having a substantially constant inner diameter axially between mounting surface 156 and upstream end 150*a* with respect to central axis 105.

In this exemplary embodiment, each of the mounting bores 157 may circumferentially align with both a corresponding first mounting bore 35 formed in the seal end cap 130 and a corresponding one of a second plurality of downstream mounting bores 120 extending axially into the downstream end 102*b* of body 102. In this arrangement, the first plurality of downstream mounting bores 116 are circumferentially interspersed or interleaved with the second plurality of downstream mounting bores 120 about the downstream end 102*b* of body 102 so that each first downstream mounting bore 116 is circumstantially spaced between two second downstream mounting bores 120, and each second downstream mounting bore 120 is circumferentially spaced between two first downstream mounting bores 116 about central axis 105.

Additionally, a plurality of the first fasteners 62 extends axially (with respect to central axis 105) through the aligned first mounting bores 157 of the downstream hub end cap 150 and the aligned first mounting holes 35 of seal end cap 130 and into the second downstream mounting bores 120 of body 102. In some embodiments, the first fasteners 62 are threadably engaged with internal threads formed within the downstream mounting bores 120 of body 102. In addition, nuts 63 may be threadably engaged with the first fasteners 62 until the threaded nut 63 engages or abuts with the mounting surface 156 on flange 154. Thus, the seal end cap 130, along with the mounting flange 154 of the downstream hub end cap 150, may be axially compressed between the threaded nuts 63 on each of the first fasteners 62 and the downstream end 102*b* of body 102 with respect to the central axis 105.

Referring still to FIGS. 6-8, during operations, when access to the internal components of valve 100 is desired (e.g., for repair and/or replacement thereof), a first plurality of first fasteners 62 may be removed from the aligned mounting bores 157, first mounting holes 35, and the second plurality of downstream mounting bores 120 of downstream hub end cap 150, seal end cap 130, and body 102, respectively. Additionally, a second plurality of first fasteners 62 may be removed from the aligned mounting bores 147 and the plurality of upstream mounting bores 118 of upstream hub end cap 140 and body 102, respectively.

With the first and second plurality of first fasteners 62 removed from the valve 100, the body 102 and seal end cap 130 coupled thereto may be jointly lifted (or lowered) vertically in a direction generally parallel to the orthogonal axis 25 to thereby remove the coupled body 102 and seal end cap 130 from the now separated upstream hub end cap 140 and downstream hub end cap 150. In some instances, the flexibility inherent in the fluid conduits to which the pair of hub end caps 140 and 150 are attached may be utilized in providing sufficient space for vertically removing the coupled body 102 and seal end cap 130.

As the coupled body 102 and seal end cap 130 are removed, the upstream hub end cap 140 may remain attached to the fluid conduit (e.g., upstream pipe 5) to which it is coupled and similarly the downstream hub end cap 150 may remain attached to the fluid conduit (e.g., downstream pipe 7) to which it is coupled. In this manner, the body 102 and seal end cap 130 may be removed from the fluid conduit along which the valve 100 was integrated simply by removing the first and second pluralities of first fasteners 62 and without cutting or otherwise severing any permanent connections (e.g., welded connections) established between the pair of hub end caps 140 and 150 and the fluid conduits (e.g., pipes 5 and 7) coupled therewith. Additionally, following removal of the coupled body 102 and seal end cap 130, the seal end cap 130 may be decoupled from the body 102 (e.g., in a shop environment distal the operational location of the valve 100) to allow for the desired refurbishment and/or replacement of components of the body 102 and seal end cap 130.

The embodiments disclosed herein include valves that may be repaired or serviced without needing to remove the valve from the fluid conduit. Thus, through use of the embodiments disclosed herein, repair and/or service operations for a valve may be more efficient and less costly.

While exemplary embodiments have been shown and described, modifications thereof can be made by one skilled in the art without departing from the scope or teachings herein. The embodiments described herein are exemplary only and are not limiting. Many variations and modifications of the systems, apparatus, and processes described herein are possible and are within the scope of the disclosure. Accordingly, the scope of protection is not limited to the embodiments described herein, but is only limited by the claims that follow, the scope of which shall include all equivalents of the subject matter of the claims. Unless expressly stated otherwise, the steps in a method claim may be performed in any order. The recitation of identifiers such as (a), (b), (c) or (1), (2), (3) before steps in a method claim are not intended to and do not specify a particular order to the steps, but rather are used to simplify subsequent reference to such steps.

What is claimed is:

1. A valve, comprising:
   a body having a first end, a second end opposite the first end, and a throughbore extending from the first end to the second end along a central axis;
   a valve element positioned within the throughbore for selectably isolating fluid flow through the throughbore;
   a seal end cap having a throughbore and including a flange and a neck, wherein the neck is inserted into the throughbore of the body from the second end of the body to engage with the valve element;
   a hub end cap having a throughbore and including a mounting flange engaged with the flange of the seal end cap, wherein the throughbore of the seal end cap and the throughbore of the hub end cap each form at least a portion of a flowpath along which fluid is directed between opposing ends of the valve;

a first plurality of fasteners that extend through the mounting flange of the hub end cap and terminate within the flange of the seal end cap; and an annular seal member positioned between the flange of the seal end cap and the mounting flange of the hub end cap, wherein the annular seal member is compressed by the first plurality of fasteners;

wherein the flange of the seal end cap is engaged with the second end of the body whereby the flange of the seal end cap is compressed between the second end of the body and the mounting flange of the hub end cap, and wherein the seal end cap and the hub end cap each have a central axis parallel to one another and extending through the body.

2. The valve of claim 1, further comprising a second plurality of fasteners that extend through the flange of the seal end cap and terminate in the body to compress the seal end cap against the second end of the body.

3. The valve of claim 2, wherein the second plurality of fasteners each comprise a threaded stud that is threadably engaged within the body.

4. The valve of claim 2, wherein the second plurality of fasteners each extend between a first end that terminates in the body and a second end that terminates in the seal end cap such that the second end of the fastener does not project axially from the seal end cap.

5. The valve of claim 2, wherein the first plurality of fasteners are circumferentially interleaved with the plurality of second fasteners about the central axis.

6. The valve of claim 2, comprising:

an upstream valve seat positioned within the throughbore of the body; and a downstream valve seat formed on the neck of the seal end cap, wherein the upstream valve seat is positioned between the valve element and the first end of the body, wherein the upstream valve seat includes a seating surface that is engaged with the valve element; and wherein the downstream valve seat includes a seating surface that is engaged with the valve element.

7. The valve of claim 1, wherein:

the hub end cap comprises a first hub end cap of the valve; and the valve further comprises a second hub end cap including a mounting flange engaged with the second end of the body.

8. A fluid conduit system, comprising:

the valve of claim 7;

a first fluid conduit welded to the first hub end cap; and a second fluid conduit welded to the second hub end cap, and wherein the seal end cap and the body of the valve are each releasably coupled to both the first fluid conduit and the second fluid conduit.

9. A valve, comprising:

a body having a first end, a second end opposite the first end, and a throughbore extending from the first end to the second end along a central axis;

a valve element positioned within the throughbore;

a seal end cap having an inner surface defining a throughbore of the body, the seal end cap including a flange and a neck along both of which the inner surface extends, wherein the neck is inserted into the throughbore from the second end of the body to engage with the valve element;

a hub end cap having a throughbore and including a mounting flange having an annular mounting surface that defines an end of the hub end cap, wherein the mounting surface is configured to be welded to a first pipe, and wherein the mounting flange of the hub end cap is engaged with the flange of the seal end cap; and a first plurality of fasteners that extend through the mounting flange of the hub end cap, and terminate within the flange of the seal end cap, the plurality of first fasteners configured to releasably couple the body to the first pipe;

wherein the throughbore of the seal end cap and the throughbore of the hub end cap each form at least a portion of a flowpath along which fluid is directed between opposing ends of the valve whereby the inner surface extending along both the flange and the neck of the seal end cap is in fluid contact with the flowpath.

10. The valve of claim 9, further comprising a second plurality of fasteners that extend through the flange of the seal end cap and terminate within the body to releasably couple the seal end cap to the body.

11. The valve of claim 10, wherein the first plurality of fasteners are circumferentially interleaved with the second plurality of fasteners about the central axis.

12. The valve of claim 10, wherein the second plurality of fasteners terminate in the seal end cap such that the second plurality of fasteners do not project axially into the hub end cap.

13. The valve of claim 10, wherein the first plurality of fasteners each comprise a threaded stud that is threadably engaged within the body.

14. The valve of claim 10, wherein the second plurality of fasteners each comprise a threaded screw that is threadably engaged within the body.

15. A valve, comprising:

a body having a first end, a second end opposite the first end, and a throughbore extending from the first end to the second end along a central axis of the body;

a valve element positioned within the throughbore for selectably isolating fluid flow through the throughbore;

a seal end cap having a throughbore and including a flange and a neck, wherein the neck is inserted into the throughbore of the body from the second end of the body to engage with the valve element;

a hub end cap having a throughbore and including a mounting flange engaged with the flange of the seal end cap, wherein the throughbore of the seal end cap and the throughbore of the hub end cap each form at least a portion of a flowpath along which fluid is directed between opposing ends of the valve;

a plurality of fasteners that extend through the flange of the seal end cap and terminate in the body to compress the seal end cap against the second end of the body; and an annular seal member positioned between the seal end cap and the body, wherein the annular seal member is compressed by the plurality of fasteners along the central axis of the body;

wherein the flange of the seal end cap is engaged with the second end of the body whereby the flange of the seal end cap is compressed between the second end of the body and the mounting flange of hub end cap.

16. The valve of claim 15, wherein the plurality of fasteners each comprise a threaded stud that is threadably engaged within the body and configured to engage with the annular seal member.

17. The valve of claim 16, wherein the plurality of fasteners each extend between a first end that terminates in the body and a second end that terminates in the seal end cap such that the second end of the fastener does not project axially from the seal end cap.

18. The valve of claim 15, further comprising:

a separate plurality of fasteners that extend through the mounting flange of the hub end cap and terminate within the flange of the seal end cap.

19. The valve of claim 18, wherein the first plurality of fasteners are circumferentially interleaved with the plurality of second fasteners about the central axis.

20. The valve of claim 16, comprising:

an upstream valve seat positioned within the throughbore of the body; and a downstream valve seat formed on the neck of the seal end cap, wherein the upstream valve seat is positioned between the valve element and the first end of the body, wherein the upstream valve seat includes a seating surface that is engaged with the valve element; and wherein the downstream valve seat includes a seating surface that is engaged with the valve element.

\*    \*    \*    \*    \*